United States Patent
Ryan et al.

(10) Patent No.: US 10,414,446 B2
(45) Date of Patent: Sep. 17, 2019

(54) LIGHTWEIGHT VEHICLE PAN ASSEMBLY AND METHOD FOR ATTACHMENT TO VEHICLE FRAME VIA WELDING

(71) Applicants: Honda Motor Co., Ltd., Tokyo (JP); Magna International Inc., Aurora, Ontario (CA)

(72) Inventors: James P. Ryan, Powell, OH (US); Alexander Hutter, Plain City, OH (US); Robb L. Augustine, Dublin, OH (US); Chad James Stewart, Novi, MI (US); Carlo Virgilio Porretta, Woodbridge (CA)

(73) Assignees: Honda Motor Co., Ltd., Tokyo (JP); Magna International Inc., Aurora, Ontario (CA)

( * ) Notice: Subject to any disclaimer, the term of this patent is extended or adjusted under 35 U.S.C. 154(b) by 133 days.

(21) Appl. No.: 15/493,835

(22) Filed: Apr. 21, 2017

(65) Prior Publication Data

US 2017/0305474 A1 Oct. 26, 2017

Related U.S. Application Data

(60) Provisional application No. 62/326,044, filed on Apr. 22, 2016.

(51) Int. Cl.
*B62D 29/00* (2006.01)
*B62D 27/02* (2006.01)
(Continued)

(52) U.S. Cl.
CPC ............ *B62D 29/004* (2013.01); *B23K 31/02* (2013.01); *B23K 33/008* (2013.01); *B29C 70/68* (2013.01);
(Continued)

(58) Field of Classification Search
CPC .. B62D 43/08; B62D 29/004; B62D 25/2027; B62D 25/2018; B29C 70/72
(Continued)

(56) References Cited

U.S. PATENT DOCUMENTS 3,470,598 A 10/1969 Berthelsen
4,106,962 A 8/1978 Adams et al.
(Continued)

FOREIGN PATENT DOCUMENTS

| DE | 4215427 | 1/1993 |
| EP | 1754635 | 2/2007 |
| WO | 2005090048 | 9/2005 |

OTHER PUBLICATIONS

Grujicic et al.: "The Potential of a Clinch-Lock Polymer Metal Hybrid Technology for Use in Load-Bearing Automotive Components", Journal of Materials Engineering and Performance, vol. 18(7) Oct. 2009, pp. 893-902.
(Continued)

*Primary Examiner* — Jason S Morrow
(74) *Attorney, Agent, or Firm* — Mark E. Duell; Rankin Hill & Clark LLP (57) ABSTRACT

A lightweight vehicle pan assembly and for attachment to a vehicle frame via welding includes at least one metal flange and a molded pan body. The at least one metal flange has a weld portion adapted for welded attachment to the vehicle frame and an interface portion extending from the weld portion. The molded pan body has a base wall and at least one side wall extending upward from the base wall. The interface portion of the at least one metal flange is embedded in the at least one side wall of the molded pan body. The interface portion includes at least two rows of apertures defined therein for increasing a bond strength between the at least one metal flange and the molded pan body.

19 Claims, 7 Drawing Sheets

(51) Int. Cl.

| | | |
|---|---|---|
| *B29C 70/72* | (2006.01) | |
| *B23K 31/02* | (2006.01) | |
| *B23K 33/00* | (2006.01) | |
| *B29C 70/68* | (2006.01) | |
| *B62D 25/20* | (2006.01) | |
| *B29K 705/00* | (2006.01) | |
| *B29L 31/30* | (2006.01) | |
| *B23K 101/00* | (2006.01) | |
| *B23K 101/18* | (2006.01) | |
| *B23K 103/16* | (2006.01) | |

(52) U.S. Cl.
CPC .......... *B29C 70/72* (2013.01); *B62D 25/2027* (2013.01); *B62D 27/02* (2013.01); *B23K 2101/006* (2018.08); *B23K 2101/185* (2018.08); *B23K 2103/16* (2018.08); *B29K 2705/00* (2013.01); *B29L 2031/30* (2013.01); *B60Y 2304/03* (2013.01); *B60Y 2410/123* (2013.01)

(58) Field of Classification Search
USPC .......... 296/191, 193.07, 187.07, 37.14, 37.2
See application file for complete search history.

(56) References Cited

U.S. PATENT DOCUMENTS

| | | |
|---|---|---|
| 4,912,826 A | 4/1990 | Dixon et al. |
| 4,954,387 A | 9/1990 | Sikorski |
| 5,190,803 A | 3/1993 | Goldbach et al. |
| 5,382,505 A | 1/1995 | Schmidt et al. |
| 5,672,405 A | 9/1997 | Plank, Jr. et al. |
| 5,842,265 A | 12/1998 | Rink |
| 5,940,949 A | 8/1999 | Rink |
| 6,528,141 B1 | 3/2003 | Watson et al. |
| 6,584,950 B1 | 7/2003 | Cunningham |
| 6,688,680 B1* | 2/2004 | Cooper ................ B62D 25/145 296/208 |
| 6,708,583 B2 | 3/2004 | Palmer et al. |
| 7,025,921 B2 | 4/2006 | Ilse et al. |
| 7,449,137 B2 | 11/2008 | Staargaard et al. |
| 7,654,237 B2 | 2/2010 | Cunningham |
| 7,841,577 B2 | 11/2010 | Yamaguchi et al. |
| 7,919,032 B2 | 4/2011 | Yamaguchi et al. |
| 9,598,123 B1* | 3/2017 | Tavakoli-Targhi .... B62D 43/10 |
| 9,701,250 B1* | 7/2017 | Ranga ................ B60R 11/0223 |
| 2003/0008105 A1 | 1/2003 | Haack et al. |
| 2004/0072006 A1* | 4/2004 | Staargaard ........ B29C 45/14344 428/544 |
| 2005/0229530 A1* | 10/2005 | Schmidt ............ B29C 45/14311 52/630 |
| 2006/0210735 A1 | 9/2006 | Colombo et al. |
| 2009/0162635 A1 | 6/2009 | Wada et al. |
| 2011/0227367 A1* | 9/2011 | Funakoshi ........... B62D 25/087 296/187.11 |
| 2015/0197289 A1* | 7/2015 | Kurokawa ........... B62D 29/005 296/187.08 |
| 2015/0336304 A1* | 11/2015 | Bosg ...................... B29C 33/14 428/209 |
| 2016/0016614 A1* | 1/2016 | Conze .................... B29C 70/86 296/193.12 |

OTHER PUBLICATIONS

Luverne Truck Equipment, Installation Instructions and Parts List, Jul. 2, 2008, 7 pages.

* cited by examiner

LIGHTWEIGHT VEHICLE PAN ASSEMBLY AND METHOD FOR ATTACHMENT TO VEHICLE FRAME VIA WELDING

The present application claims priority to U.S. Prov. Patent App. Ser. No. 62/326,044, filed Apr. 22, 2016, the entirety of which is expressly incorporated herein.

BACKGROUND

Most vehicles in North America as well as world-wide have some area devoted to cargo storage, carrying, etc. Additionally, many vehicles (particularly sedan-type vehicles) contain some storage area for a spare tire, often within the trunk of the vehicle. The space designed for such storage has traditionally been made of stamped steel sheet formed to hold these items (such as a spare tire, jack, etc.) and attached to the vehicle white body by means of welding. Recently, with an increased emphasis on vehicle lightweighting, many vehicle parts traditionally made of steel are being replaced with other materials such as aluminum and plastic. One such part is the spare tire well of sedan-type vehicles. Several vehicle manufacturers have recently begun making these spare tire wells out of molded plastic.

Attaching non-steel parts to the vehicle white body can present numerous technical challenges compared to traditional fastening methods for metal-to-metal connections. Mechanical attachments such as bolts, screws, or rivets are possible, but such methods present challenges for non-metal parts in terms of long-term durability of the attachment due to various concerns, such as from heat and continuous loading. Such conditions can potentially cause premature failure of the connections due to torque loss from creep in the non-metal material. Such concerns can potentially be alleviated by using metal collars inserted into the fastening area of the non-metal part to ensure metal-to-metal contact between the fastener and the vehicle body. One alternative fastening method involves the use of adhesives to bond the non-metal part to the metal structure. However, this method is often time consuming and causes significant changes to the manufacturing environment that may be expensive and/or time consuming for the vehicle manufacturer.

SUMMARY

According to one aspect, a lightweight vehicle pan assembly for attachment to a vehicle frame via welding includes at least one metal flange and a molded pan body. The at least one metal flange has a weld portion adapted for welded attachment to the vehicle frame and an interface portion extending from the weld portion. The molded pan body has a base wall and at least one side wall extending upward from the base wall. The interface portion of the at least one metal flange is embedded in the at least one side wall of the molded pan body. The interface portion includes at least two rows of apertures defined therein for increasing a bond strength between the at least one metal flange and the molded pan body.

According to another aspect, a method is provided for making a lightweight vehicle pan assembly. In the method, at least one metal flange having a weld portion adapted for welded attachment to a vehicle frame and an interface portion adapted for overmolding is provided. A pan body having a base wall and at least one sidewall extending upward from the base wall is molded. Molding of the pan body includes overmolding the interface portion of the at least one metal flange to embed the interface portion of the at least one metal flange in the at least one sidewall of the pan body. The interface portion includes at least two rows of aperture defined therein for increasing a bond strength between the at least one metal flange and the pan body.

According to a further aspect, a method is provided for assembling and installing a vehicle pan assembly in a vehicle. In the method, at least one metal flange is provided having a weld portion and an interface portion extending from the weld portion. The interface portion has at least two rows of apertures thereon. A pan body is molded having a base wall and at least one sidewall extending upward from the base wall. The pan body is molded through the at least two rows of apertures to increase a bond strength between the pan body and the at least one metal flange. While molding the pan body, the interface portion of the at least one metal flange is overmolded so as to embed the interface portion in the at least one sidewall to thereby integrally connect the at least one metal flange and the pan body. The at least one metal flange is then welded to the vehicle frame members of the vehicle to install the pan body in the vehicle.

DETAILED DESCRIPTION

It should, of course, be understood that the description and drawings herein are merely illustrative and that various modifications and changes can be made in the structures disclosed without departing from the present disclosure. In general, the figures and the exemplary vehicle pan assembly (and vehicle frame) are not necessarily to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It is also to be appreciated that the various identified components of the exemplary vehicle pan assembly and the vehicle frame disclosed herein are merely terms of art that may vary from one manufacturer to another and should not be deemed to limit the present disclosure.

Figure 1:
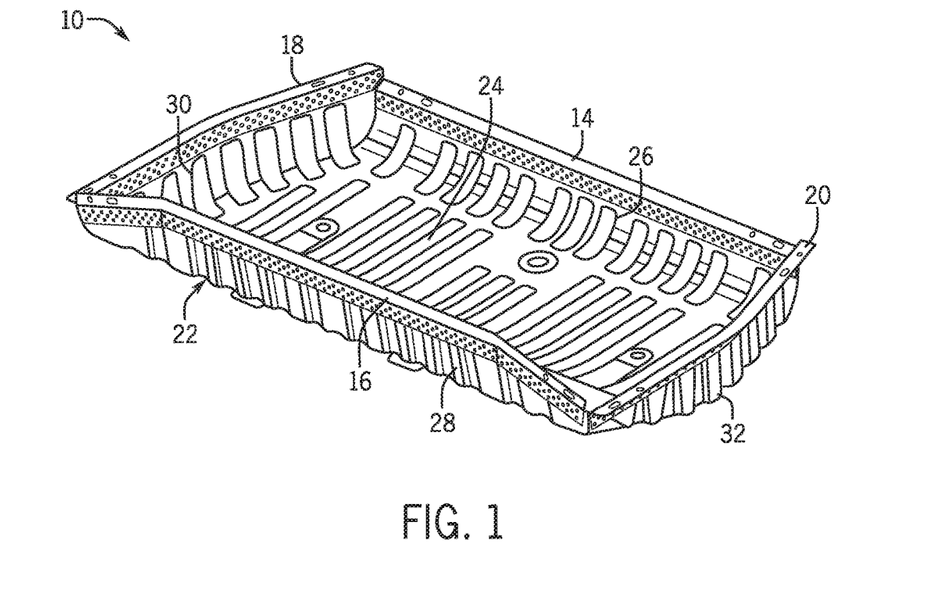
FIG. 1 is a perspective view of a lightweight vehicle pan assembly according to an exemplary embodiment.
Figure 3:
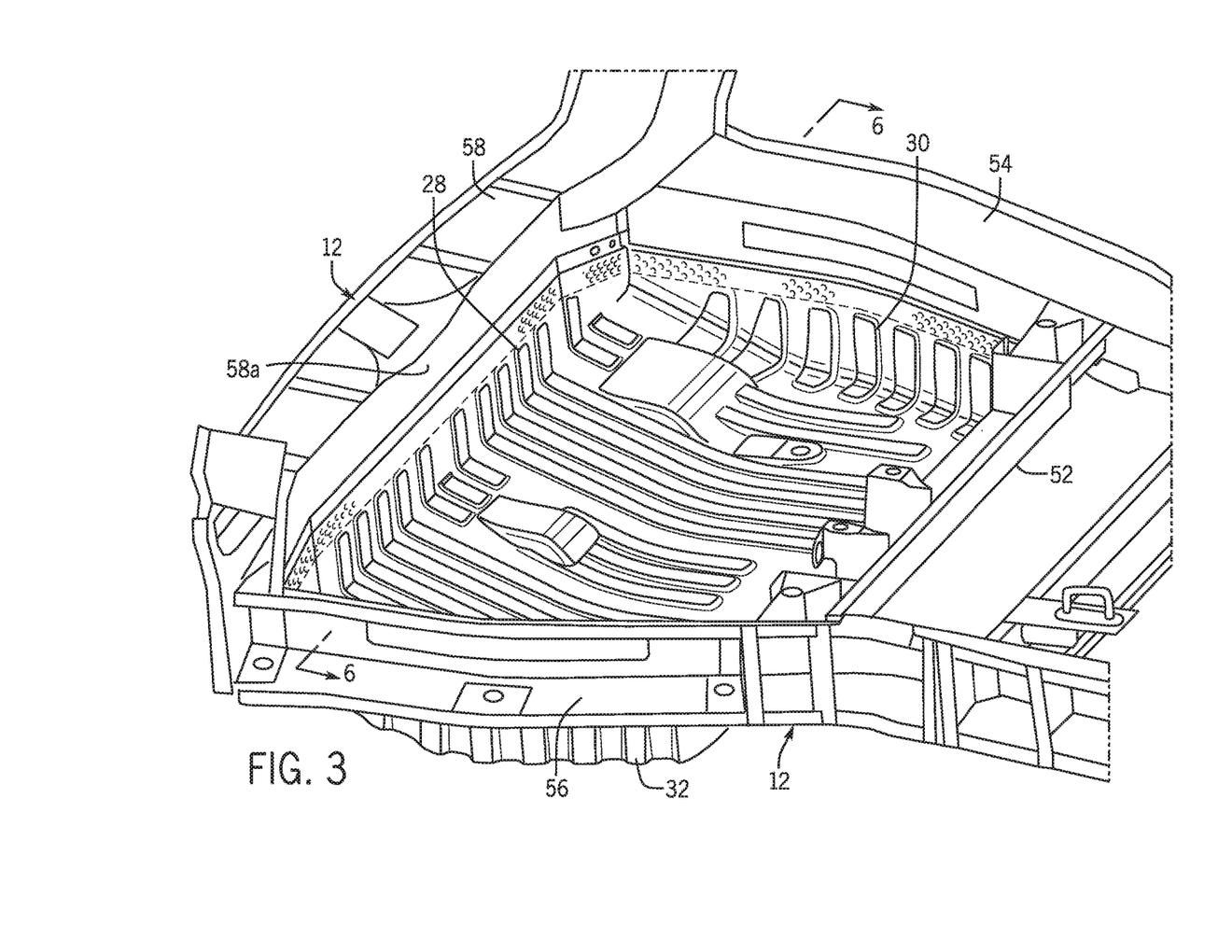
FIG. 3 is an upper perspective view showing the vehicle pan assembly of FIG. 1 mounted to a vehicle frame.
Figure 4:
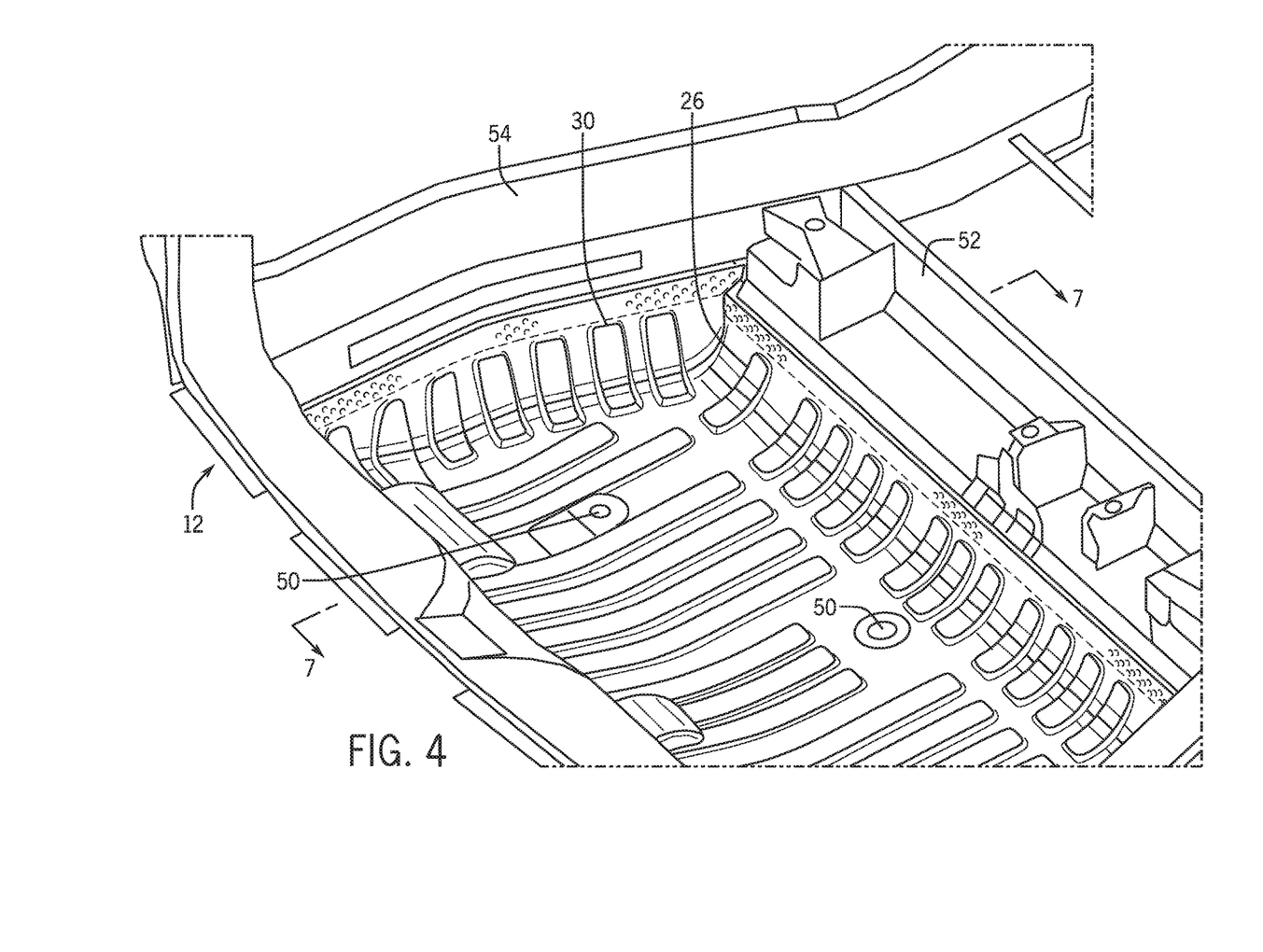
FIG. 4 is another upper perspective view showing the vehicle pan assembly mounted to the vehicle frame.
Figure 5:
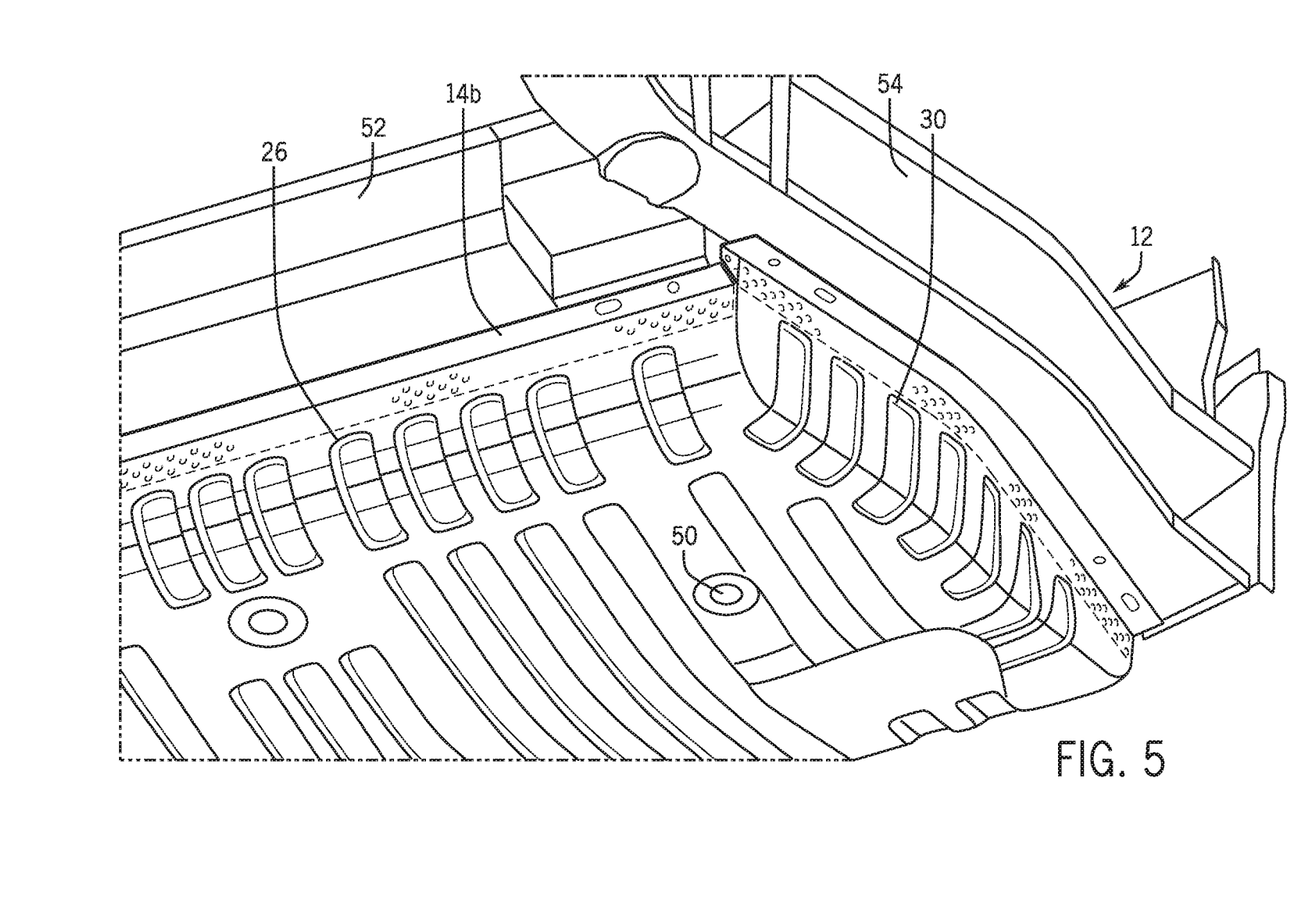
FIG. 5 is an underside perspective view showing the vehicle pan assembly mounted to the vehicle frame.
Figure 6:
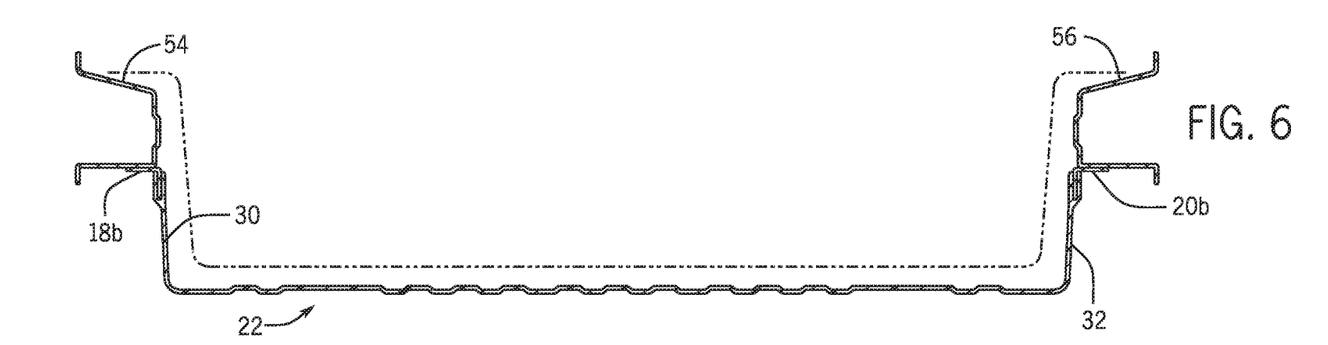
FIG. 6 is a cross-section view taken along the line 6-6 of FIG. 3.
Figure 7:
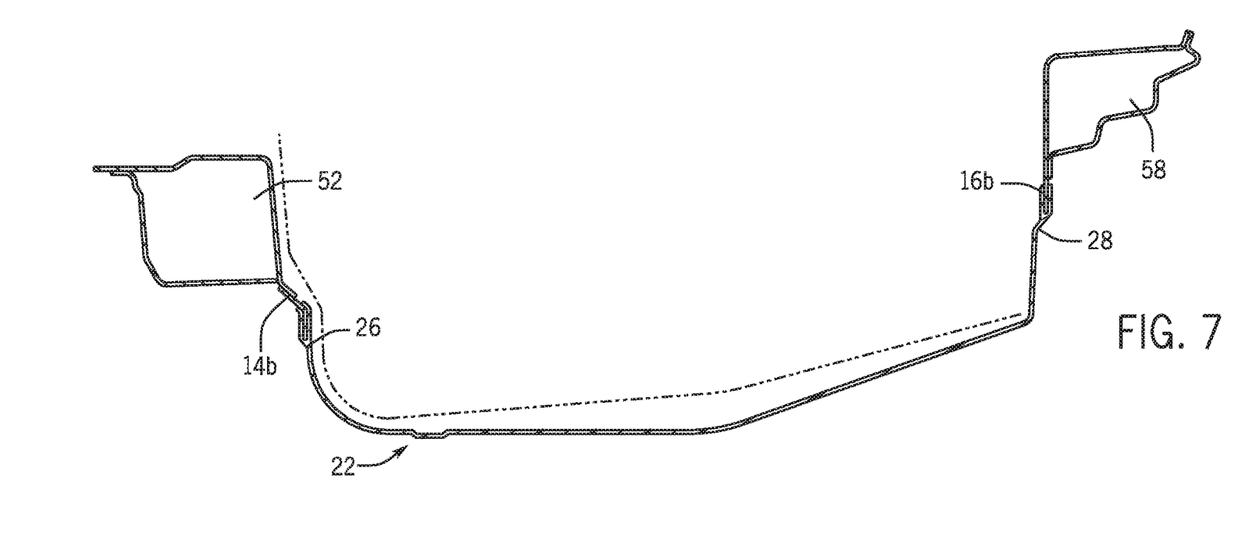
FIG. 7 is a cross-section view taken along the line 7-7 of FIG. 4.

Referring now to the drawings wherein the showings are for purposes of illustrating one or more exemplary embodiments and not for purposes of limiting same, FIG. 1 illustrates a lightweight vehicle pan assembly 10 for attachment to a vehicle frame 12 (see FIGS. 3-5) via welding according to an exemplary embodiment. The pan assembly 10 includes at least one metal flange (e.g., flanges 14, 16, 18, and 20) having a weld portion (e.g., weld portion 14b on flange 14) adapted for welded attachment to the vehicle frame 12 and an interface portion (e.g., interface portion 14a on flange 14) extending from the weld portion. The pan assembly 10 also includes a molded pan body 22 having a base wall 24 and at least one sidewall (e.g., sidewalls 26, 28, 30, 32) extending upward from the base wall 24. The molded pan body 22 can be formed from a fiber reinforced plastic, for example. As will be described in more detail below, the interface portion of the at least one metal flange is embedded in the at least one sidewall of the molded pan body 22 and includes at least two rows of apertures defined therein for increasing a bond strength between the at least one metal flange and the molded pan body 22. In particular, this arrangement provides a bond strength between the at least one metal flange and the pan body 22 that is equivalent to two spot welds at an 80 mm pitch along the at least one metal flange.

In the illustrated embodiment, the at least one sidewall of the molded pan body 22 includes a forward sidewall 26, a rearward sidewall 28 spaced apart from the forward sidewall 26, and a pair of spaced apart lateral sidewalls 30, 32 (i.e., left sidewall 30 relative to a forward direction of travel of the vehicle and right sidewall 32 relative to a forward direction of travel of the vehicle) extending between the forward and rearward sidewalls 26, 28. In one embodiment, the thickness of each of the sidewalls 26, 28, 30 and 32, at least at the location where the sidewall is overmolded onto the interface portion of the at least one metal flange, is 2.5 mm. With additional reference to FIG. 2, in the illustrated embodiment, the at least one metal flange includes a first or forward metal flange 14 having a first metal flange interface portion 14a thereof embedded in the forward sidewall 26 so that a first metal flange weld portion 14b thereof projects forward of the molded pan body 22. The at least one metal flange of the illustrated embodiment also includes another metal flange (e.g., one or more of flanges 16, 18, 20) having a metal flange interface portion thereof that is embedded in at least one of the rearward sidewall 28 and a pair of spaced part lateral sidewalls 30, 32.

Figure 2:
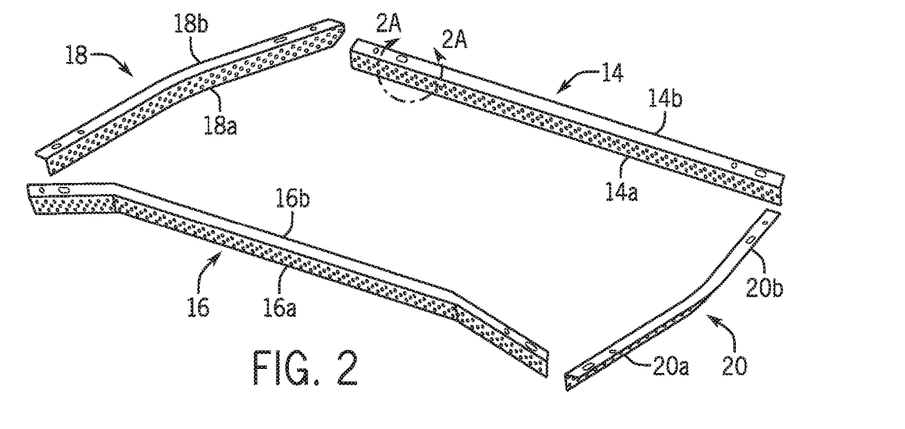
FIG. 2 is a perspective exploded view showing metal flanges of the vehicle pan assembly of FIG. 1 in isolation.

Particular to the illustrated embodiment, the at least one metal flange specifically includes a second or rearward metal flange 16 having a second metal flange interface portion 16a embedded in the rearward sidewall 28 so that a second metal flange weld portion 16b projects vertically upward relative to the molded pan body 22. Further, the at least one metal flange of the illustrated embodiment includes third metal flange 18 and fourth metal flange 20. The third metal flange 18 has an interface portion 18a embedded in the sidewall 30 and a weld portion 18b projecting laterally from the molded pan body 22. Likewise, the metal flange 20 has a fourth metal flange interface portion 20a embedded in the sidewall 32 and a fourth metal flange weld portion 20b projecting laterally relative to the molded pan body 22. It is contemplated that fewer or more than four metal flanges could be used. For example, two or more of the flanges could be combined into a single part.

More particularly, and as best shown in FIG. 2, the weld portion 14b of the flange 14 is angularly oriented relative to the interface portion 14a such that the weld portion 14b projects forward at an obtuse angle relative to the interface portion 14a. The weld portion 16b of the flange 16, however, is generally coplanar with the interface portion 16a. The interface portion 20a of the flange 20 is embedded in the sidewall 30 and the weld flange 20b of the flange 20 is perpendicularly oriented relative to the interface portion 20a. Likewise, the interface portion 20a of the flange 20 is embedded in the sidewall 32 and the weld portion 20b of the flange 20 is perpendicularly oriented relative to the interface portion 20a. Accordingly, the weld portions 18b, 20b of the flanges 18, 20 are, respectively, oriented orthogonally relative to the respective interface portions 18a, 20a of the flanges 18, 20 so that the weld portions 18b, 20b extend outward away from the respective sidewalls 30, 32.

To embed the interface portions 14a, 16a, 18a, 20a of the flanges 14, 16, 18, 20 in their respective sidewalls, 26, 28, 30, 32, the molded pan body 22 is overmolded onto the metal flanges 14, 16, 18, 20 as will be described in more detail below. To increase a bond strength between the flanges 14-20 and the molded pan body 22, as mentioned above, the respective interface portions 14a, 16a, 18a, 20a can include at least two rows of apertures defined therein. In the illustrated embodiment, the interface portions 14a, 16a, 18a, 20a are generally the same or very similar so that only interface portion 14a of the flange 14 will be described in further detail herein. However, it is to be appreciated that the features described in association with the interface portion 14a of the flange 14 can be likewise provided on the flanges 16, 18, and 20.

Figure 2A:
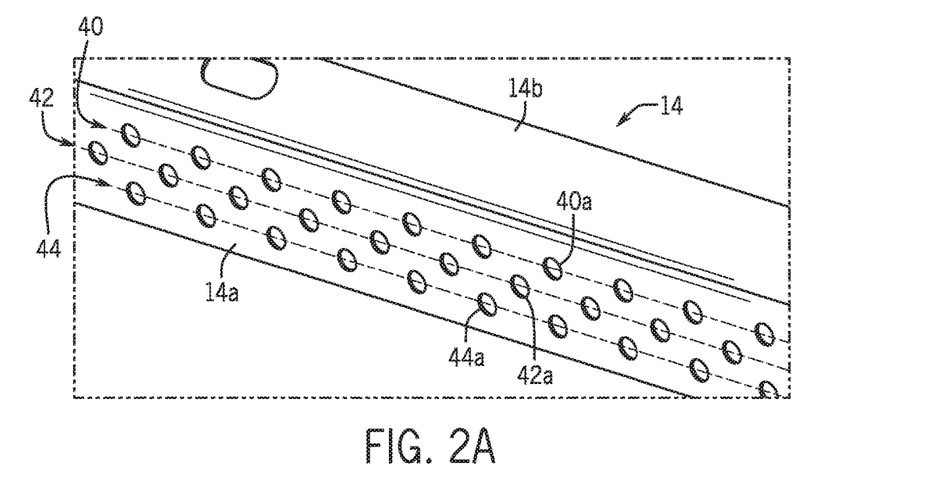
FIG. 2A is a partial enlarged view of one of the flanges from FIG. 2.

With additional reference to FIG. 2A, wherein a partial enlarged portion of flange 14 is shown, the interface portion 14a includes three rows of apertures 40, 42, 44 defined therein. In one embodiment, the thickness of the interface portion 14a and the weld portion 14b is 0.7 mm. As shown, the three rows of apertures 40, 42, 44 are spaced apart from one another vertically along the interface portion 14a. Additionally, as shown, each of the three rows of apertures 40, 42, 44 can be offset relative to any adjacent ones of the three rows of apertures 40, 42, 44. More particularly, the three rows of apertures 40, 42, 44 include a first row 40, a second row 42, and a third row 44. In the illustrated embodiment, third row apertures 44a of the third row 44 are in vertical alignment with first row apertures 40a of the first row 40. However, second row apertures 42a of the second row 42 are offset relative to the first row apertures 40a such that each of the second row apertures 42a is located laterally between adjacent ones of the first row apertures 40a. Likewise, the second row apertures 42a are offset relative to the third row apertures 44a such that each of the second row apertures 42a is also located laterally between adjacent ones of the third row apertures 44a.

In the illustrated embodiment, the apertures 40a, 42a, 44a are throughholes that extend through their respective metal flanges 14, 16, 18, 20. As shown, a lateral spacing between adjacent apertures 40a, 42a, 44a within each of the rows 40, 42, 44 can be approximately three times a diameter of each aperture 40a, 42a, 44a. For example, each of the apertures 40a, 42a, 44a can have a diameter of 6 mm and the spacing between adjacent apertures within a given row can be 18 mm (i.e., 24 mm from center point of aperture to center point of adjacent aperture). Vertical spacing between the rows can be approximately a radius dimension of each aperture (e.g., 3 mm, which can be 9 mm between the center point of an aperture in one row to the center point of an aperture in an adjacent row). This also vertically spaces apart aligned ones of the apertures (e.g., 40a and 44a) in the first and third rows by 12 mm (i.e., 18 mm from center point to center point).

Of course, the interface portion 14a of the flange 14 has a vertical dimension sufficient to accommodate the three rows of apertures 40, 42, 44. In one embodiment, the vertical height of the interface portion 14a is approximately 32 mm.

The weld portion 14b can likewise have a dimension extending from the interface portion 14a to a distal edge of the weld portion 14b sufficient to permit welded attachment to the vehicle frame 12. In one embodiment, this dimension is 18 mm, including 15 mm for accommodating spot welding and 3 mm to provide for weld flash management. Additionally, the thickness of the flange 14 can be, for example, 2.5 mm whereas an approximate thickness of the sidewalls 26, 28, 30, 32 and the base wall 24 can be about 7.0 mm (though this can vary). Where the interface portion 14a has a height of 32 mm and the lateral distance between center points of the apertures in a given row (e.g., adjacent apertures 40a in the first row 40) is 24 mm, a concentration ratio can be calculated as 683.2 mm$^2$ of flange to 84.8 mm$^2$ of aperture.

Figure 8A:
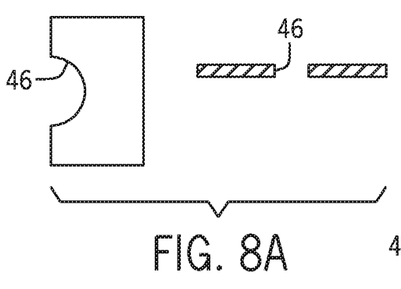
FIGS. 8A-8D illustrate various aperture configurations for a metal flange interface portion of the vehicle pan assembly of FIG. 1.
Figure 8B:
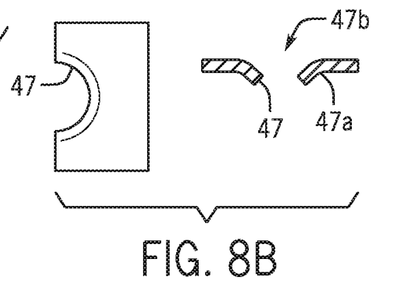
Figure 8C:
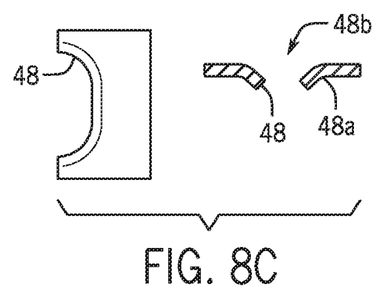
Figure 8D:
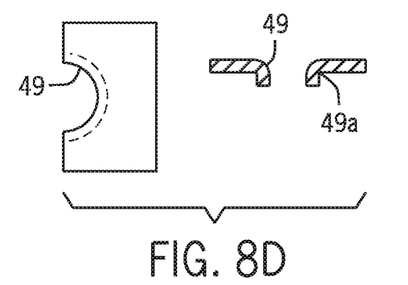

While the apertures 40a, 42a, 44a in the illustrated embodiment are round throughholes, it is to be appreciated by those skilled in the art that other configurations are possible. For example, with additional reference to FIGS. 8A, 8B, 8C, and 8D, the apertures can have various configurations. FIG. 8A shows a simple round throughhole 46 as is used in the illustrated embodiment of FIGS. 1-7 but with a larger diameter (e.g., 8 mm). FIG. 8B shows an alternate configuration wherein aperture 47 is a round throughhole but includes a flared annular flange 47a defining a countersink area 47b. FIG. 8C shows an aperture 48 with an oval configuration and a flared annular flange 48a defining a countersink area 48b. FIG. 8D shows an aperture 49 configured as a round throughhole with an orthogonally oriented flange 49a (i.e., no flare and no countersink area). Any of these could be used for the apertures 40a, 42a, 44a and/or some other aperture configuration could be used (including a mix of aperture configurations). In one embodiment, the flange has a depth dimension of 2 mm.

With additional reference to FIGS. 3-7, the pan assembly 10, which in the illustrated embodiment is in the form of a seat pan, can be welded to floor frame members of the vehicle frame 12. In particular, the metal flanges 14, 16, 18, 20 of the pan assembly 10 can be welded to floor frame members of the vehicle frame 12. In this regard, the pan assembly 10, which can include apertures 50 defined in the base wall 24 of the molded pan body 22, can be held in place with a jig or fixture (not shown) that has figures that extend through the apertures 50. In one exemplary embodiment, the vehicle frame 12 can then be built around the molded pan assembly 10. For example, a front frame member 52 can be attached to the pan assembly 10. In particular, the weld portion 14b of the flange 14 disposed along the forward sidewall 26 can be welded to the front frame member 52. Next, side frame members 54, 56 can be attached to the pan assembly 10. In particular, side frame member 54 can be welded to the weld portion 18b of the flange 18 disposed along the sidewall 30. At the same time, the side frame member 54 can be welded to the front frame member 52. Likewise, the side frame member 56 can be welded to the weld portion 20b of the flange 20 disposed along the sidewall 32. At the same time, the side frame member 56 can be welded to the front frame member 52. Finally, rear frame member 58 can be attached to the pan assembly 10. In particular, the rear frame member 58 can be welded to the weld portion 16b of the flange 16 disposed along the rearward sidewall 28. At the same time, the rear frame member 58 can be welded to the side frame members 54, 56 thereby enclosing the pan assembly 10 with the vehicle frame 12 during construction of the vehicle frame 12.

Notably, the weld portion 14b of the flange 14 overlaps an underside of the front frame member 52. Likewise, the weld portions 18b, 20b of the flanges 18, 20 overlap respective undersides of the side frame members 54, 56. In contrast, the weld portion 16b of the flange 16 overlaps a forward facing side 58a of the rear frame member 58. This arrangement wherein the weld flanges 14, 18, 20 overlap undersides of their respective frame members 50, 54, 56 and the flange 16 overlaps the forward side 58a of the rear frame member 58 further emphasizes the advantages of the illustrated embodiment in that the bond strength between the molded pan body 22 and the flanges 14, 16, 18, 20 is important as this bond strength is the sole attachment between the molded pan body and the vehicle frame 12. After the vehicle frame 12 is constructed around the pan assembly 10, both can go through an e-coat process and an oven bake as is known to those skilled in the art.

Figure 9:
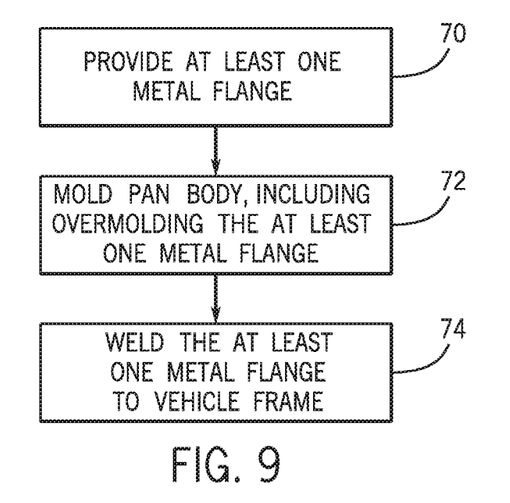
FIG. 9 is a block diagram illustrating a method for making a lightweight vehicle pan assembly according to an exemplary embodiment.

With reference now to FIG. 9, a method for making a lightweight vehicle pan assembly will be described. In particular, a method will be described in association with the pan assembly 10 and vehicle frame 12 discussed hereinabove, though this is not required and it should be appreciated by those skilled in the art that the method can be used with other pan assemblies and/or vehicle frames. In the method, as indicated at 70, at least one metal flange having a weld portion adapted for welded attachment to the vehicle frame 12 and an interface portion adapted for overmolding is provided. Next, at 72, the pan body 22 having the base wall 28 and at least one sidewall (e.g., sidewalls 26, 28, 30, 32) extending upward from the base wall 24 is molded. In particular, molding of the pan body 22 can include overmolding the interface portion of the at least one metal flange to embed the interface portion of the at least one metal flange in the at least one sidewall of the pan body.

As already described herein, the interface portion can include at least two rows of apertures (e.g., rows 40, 42, 44) defined therein for increasing a bond strength between the at least one metal flange and the pan body 22. As described hereinabove, the at least one metal flange over molded by the pan body 22 includes first flange 14, second flange 16, third flange 18, and fourth flange 20. The method for making the pan assembly can be adapted so as to be a method for assembling and installing a vehicle pan assembly in a vehicle by including step 74 wherein the at least one metal flange is welded to the vehicle frame, particularly the vehicle frame members 52, 54, 56, 58 of the vehicle, to install the pan assembly 10 onto the vehicle frame 12.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A lightweight vehicle pan assembly for attachment to a vehicle frame via welding, comprising:
   a metal flange having a weld portion adapted for welded attachment to the vehicle frame and an interface portion extending from the weld portion; and
   a molded pan body having a base wall and at least one sidewall extending upward from the base wall, wherein the interface portion of the metal flange is embedded in the at least one sidewall of the molded pan body and wherein the interface portion includes three rows of apertures defined therein for increasing a bond strength between the metal flange and the molded pan body, wherein an area concentration ratio of metal flange interface portion to aperture is approximately 8 to 1.

2. The pan assembly of claim 1 wherein the weld portion of the metal flange is oriented orthogonally relative to the interface portion of the metal flange so that the weld portion extends outward away from the at least one sidewall.

3. The pan assembly of claim 1 wherein the at least one sidewall of the molded pan body is overmolded onto the interface portion of the at least one metal flange.

4. The pan assembly of claim 1 wherein the three rows of apertures are spaced apart from one another vertically along the interface portion.

5. The pan assembly of claim 4 wherein each of the three rows of apertures is offset relative to any adjacent ones of the three rows of apertures.

6. The pan assembly of claim 5 wherein the three rows of apertures include a first row, a second row and a third row, third row apertures of the third row are in vertical alignment with first row apertures of the first row, second row apertures of the second row offset relative to the first row apertures such that each of the second row apertures is located laterally between adjacent ones of the first row apertures.

7. The pan assembly of claim 1 wherein the apertures are throughholes that extend through the at least one metal flange.

8. The pan assembly of claim 7 wherein the apertures each include a flange disposed therearound.

9. The pan assembly of claim 8 wherein the flange is a flared annual flanges defining a countersink area.

10. The pan assembly of claim 1 wherein the at least one sidewall includes a forward sidewall, a rearward sidewall spaced apart from the forward sidewall and a pair of spaced apart lateral sidewalls extending between the forward and rearward sidewalls.

11. The pan assembly of claim 10 wherein the at least one metal flange includes a first metal flange having a first metal flange interface portion embedded in the forward sidewall so that a first metal flange weld portion projects forward of the molded pan body, and another metal flange having an interface portion thereof that is embedded in at least one of the rearward sidewall and the pair of spaced apart lateral sidewalls.

12. The pan assembly of claim 11 wherein said another metal flange is embedded in the rearward sidewall and a weld portion thereof is coplanar with an interface portion thereof.

13. The pan assembly of claim 11 wherein said another metal flange is embedded in one of the pair of spaced apart lateral walls so that a weld portion thereof is perpendicularly oriented relative to an interface portion thereof.

14. The pan assembly of claim 1 wherein the molded pan body is a seat pan and the at least one metal flange is welded to floor frame members of the vehicle frame.

15. The pan assembly of claim 1 wherein the molded pan body is formed of fiber reinforced plastic.

16. The pan assembly of claim 1 wherein a lateral spacing between adjacent apertures in each of said three rows of apertures is approximately three times a diameter of each aperture.

17. A method for making a lightweight vehicle pan assembly, comprising:
providing at least one metal flange having a weld portion adapted for welded attachment to a vehicle frame and an interface portion adapted for overmolding; and
molding a pan body having a base wall and at least one sidewall extending upward from the base wall, wherein molding the pan body includes overmolding the interface portion of the at least one metal flange to embed the interface portion of the at least one metal flange in the at least one sidewall of the pan body, wherein the interface portion includes at least two rows of apertures defined therein for increasing a bond strength between the at least one metal flange and the pan body,
wherein the interface portion includes three rows of apertures defined therein, the three rows of aperture spaced apart vertically from one another on the interface portion and the middle row of the three rows laterally offset such that middle row apertures are laterally offset relative to the apertures of the other of said three rows of apertures,
wherein a vertical spacing between the rows is approximately a radius dimension of each aperture within each of the rows, and a lateral spacing between adjacent apertures within each of the rows is approximately three times a diameter of each aperture within each of the rows.

18. The method of claim 17 wherein providing the at least one metal flange includes providing the at least one metal flange with the weld portion being oriented orthogonally relative to the interface portion so that the interface portion extends outward away from the at least one side wall after the pan body is molded.

19. A method for assembling and installing a vehicle pan assembly on a vehicle frame, comprising:
providing first and second metal flanges, each metal flange having a weld portion and an interface portion extending from the weld portion, the interface portion having at least two rows of apertures thereon;
molding a pan body having a base wall and first and second sidewalls, each sidewall extending upward from the base wall, the pan body molded through said at least two rows of apertures of each interface portion to increase a bond strength between the pan body and the first and second metal flanges, wherein, while molding the pan body, overmolding the interface portions of the first and second metal flanges so as to embed the interface portions in the respective first and second sidewalls to thereby integrally connect the first and second metal flanges and the pan body; and
welding the weld portion of the first metal flange to overlap an underside of a first vehicle frame member of the vehicle frame and welding the weld portion of the second metal flange to overlap a side wall of a second vehicle frame member to install the pan body on the vehicle frame.

* * * * *